United States Patent [19] [11] 4,238,452
McMorrow [45] Dec. 9, 1980

[54] BLOOD SPECIMEN INDEXING MEANS

[76] Inventor: John J. McMorrow, 55 Florence Ave., Oyster Bay, N.Y. 11771

[21] Appl. No.: 951,729

[22] Filed: Oct. 16, 1978

[51] Int. Cl.³ .......... G01N 1/10; B01L 9/06

[52] U.S. Cl. .......... 422/104; 211/74; 248/542

[58] Field of Search .......... 422/104, 102, 67; 211/74; 248/542

[56] References Cited

U.S. PATENT DOCUMENTS

| | | | |
|---|---|---|---|
| 3,705,788 | 12/1972 | Kolko et al. | 422/104 |
| 3,948,606 | 4/1976 | Johnson | 422/104 |
| 4,055,396 | 10/1977 | Meyer et al. | 422/104 |
| 4,124,122 | 11/1978 | Emmitt | 422/104 |

*Primary Examiner*—R. E. Serwin
*Attorney, Agent, or Firm*—James P. Malone

[57] ABSTRACT

Blood specimen indexing means. A rack for test tubes having a lower solid plate, a center plate and an upper plate, the center and upper plates having a plurality of holes for receiving test tubes. The upper plate has a plurality of peg holes to receive the one or more pegs. The test tube holes in the upper plate are numbered with consecutive two digit numbers and the peg holes are numbered with consecutive three digit and four digit numbers.

4 Claims, 2 Drawing Figures

BLOOD SPECIMEN INDEXING MEANS

This invention relates to means for indexing test tubes containing blood specimens or other materials.

BACKGROUND

In Blood Banks, for instance in Hospitals, many blood specimens are stored in test tubes for indefinite periods in refrigerators or freezers.

In a large Blood Bank there may be hundreds or thousands of different specimens in storage. The test tubes are set in racks and the racks are stacked in a refrigerator or freezer. The test tubes and racks are generally labeled with pieces of tape with writing thereon.

If it is desired to retrieve a particular specimen it is very difficult to get the proper rack and test tube because it is difficult to read the labels and the tapes frequently fall off. This can lead to serious consequences.

THE INVENTION

The present invention solves this difficulty by providing a rack which can be conveniently indexed with four digit numbers without any writing or affixing of tapes.

More specifically, in the rack of the present invention, the test tube holes have consecutive two digit numbers and the rack also has peg holes for indexing three digit and four digit numbers. Therefore, in order to retrieve a blood specimen having four digit numbers it is only necessary to check the peg holes to determine the proper rack and then remove the test tube from the numbered test tube hole.

Accordingly, a principal object of the invention is to provide new and improved test tube indexing means.

Another object of the invention is to provide new and improved blood specimen indexing means.

Another object of the invention is to provide new and improved blood specimen indexing means comprising, a rack for test tubes having a lower solid flat plate, a center flat plate and an upper flat plate, the center and upper plates having a plurality of holes for receiving test tubes, a plurality of pegs, the upper plate having a plurality of peg holes to receive the one or more pegs, the test tube holes in the upper plate being numbered with consecutive numbers and the peg holes being numbered with consecutive numbers.

These and other objects of the invention will be apparent from the following specification and drawings of which:

Figure 1:
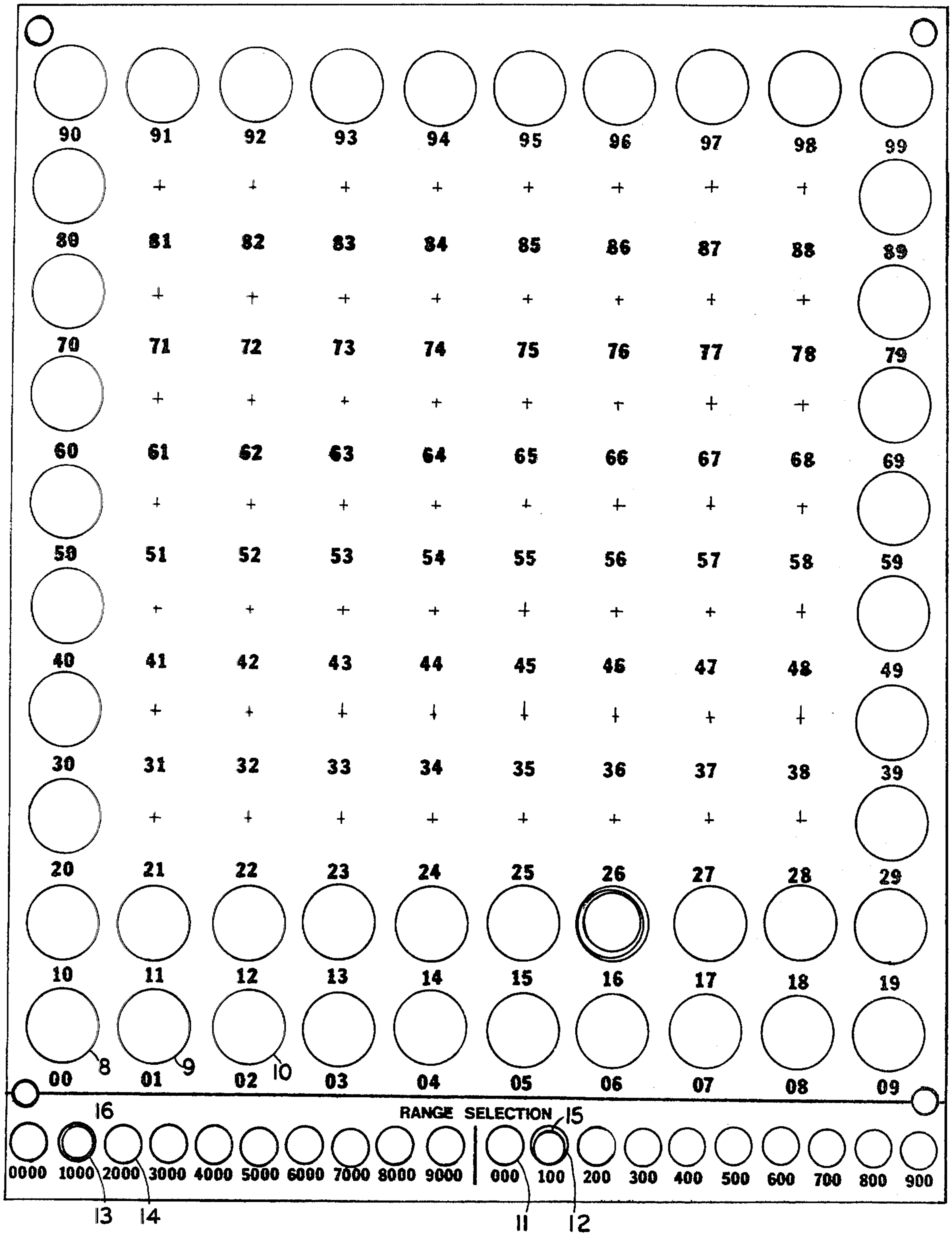
FIG. 1 is a plan view of an embodiment of the invention.
Figure 2:
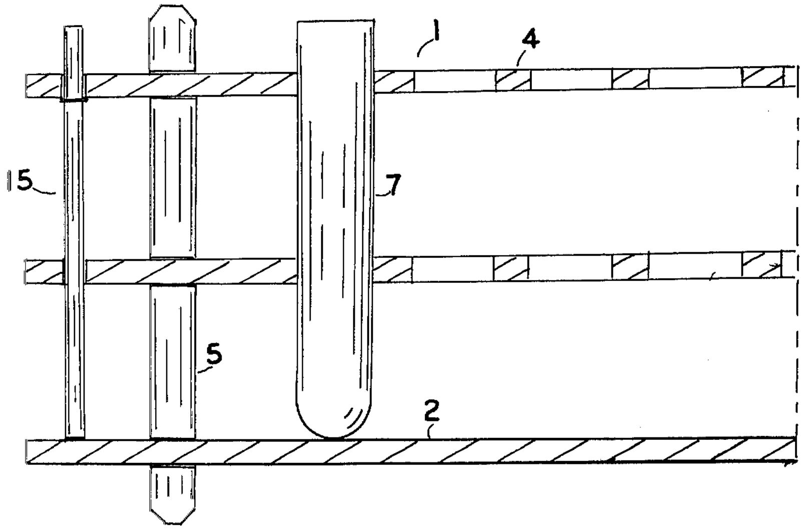
FIG. 2 is a side view of FIG. 1, partly in section.

DESCRIPTION OF PREFERRED EMBODIMENT:

Referring to the drawings, the invention comprises a rack 1, having a lower solid plate 2, a center apertured plate 3, and an upper apertured plate 4. The racks are mounted on posts 5 and 6, in conventional manner. The test tubes 7 are placed in the apertures in the plates 3 and 4.

Referring specifically to FIG. 1, there is shown a view of the upper apertured plate 4. The plate has a plurality of test tube holes 8, 9, 10, etc., which have consecutive two digit numbers. In the lower part of FIG. 1, in the section marked "Range Selection" are a plurality of peg holes 11,12,13,14, which are numbered with three digit numbers "000", "100", "200" etc., and four digit numbers "0000", "0100", "0200", etc.

In order to index a specimen, for instance number "1116" the test tube is placed in the test tube hole number "16". A first peg 15, is placed in the peg hole number "100" and a second peg 16, is placed in a peg hole numbered "1000". Therefore, in order to retrieve the specimen numbered "1116" upon opening the refrigerator it is only necessary to glance at the peg holes on the various racks to locate the rack having a peg indexing "1000" and a second peg indexing "100". Thereafter, it is easy to locate the specimen in the test tube hole numbered "16".

The plates in the rack may be made of plastic material and numbered by any conventional method such as silk screening.

Therefore, the present invention provides an accurate index system wherein the test tube specimens are easily and accurately retrievable. When a rack is emptied it can be used again with a current set of numbers. Alternatively, the peg holes may be indexed with letters or a combination of numbers and letters. For instance, the peg holes may be numbered for months and weeks and lettered for days of the week if a dating system is desired.

It is claimed:

1. Chemical specimen rack indexing means comprising:

a rack for test tubes having a lower solid flat plate, a center flat plate and an upper flat plate, the center and upper plates having a plurality of holes for receiving test tubes, the upper plate having a plurality of peg holes to receive pegs, at least one peg in one of said peg holes, the test tube holes in the upper plate being identified with indicia and the peg holes being identified with indicia, whereby rack having specimens in test tubes may be numerically indexed.

2. Apparatus as in claim 1 wherein the test tube holes in the upper plate are numbered with consecutive numbers and the peg holes are numbered with consecutive numbers.

3. Apparatus as in claim 2 wherein the holes in the upper plate are numbered with consecutive two digit numbers and the peg holes are numbered with consecutive three digit numbers whereby a three digit number may be indexed by placing a particular test tube in a particular hole and inserting the first peg to indexing a three digit number.

4. Apparatus as in claim 3 wherein the peg holes are also numbered with four digit numbers.

* * * * *